(12) United States Patent  (10) Patent No.: US 7,324,706 B2
Bassi  (45) Date of Patent: Jan. 29, 2008

(54) SYSTEM AND METHOD FOR REPRESENTING A GENERAL TWO DIMENSIONAL SPATIAL TRANSFORMATION

(75) Inventor: Zorawar S. Bassi, Markham (CA)

(73) Assignee: Silicon Optix Inc., San Jose, CA (US)

( * ) Notice: Subject to any disclaimer, the term of this patent is extended or adjusted under 35 U.S.C. 154(b) by 665 days.

(21) Appl. No.: 10/939,045

(22) Filed: Sep. 9, 2004

(65) Prior Publication Data

US 2006/0050074 A1    Mar. 9, 2006

(51) Int. Cl.
*G06K 9/64*    (2006.01)

(52) U.S. Cl. .................. 382/276; 395/127; 395/133
(58) Field of Classification Search .................. 382/276
See application file for complete search history.

(56) References Cited

U.S. PATENT DOCUMENTS

| | | | |
|---|---|---|---|
| 4,472,732 A | 9/1984 | Bennett et al. |
| 4,835,532 A | 5/1989 | Fant |
| 4,975,976 A | 12/1990 | Kimata et al. |
| 4,991,093 A | 2/1991 | Roberge et al. |
| 5,175,808 A | 12/1992 | Sayre |
| 5,204,944 A | 4/1993 | Wolberg et al. |
| 5,216,725 A | 6/1993 | McCubbrey |
| 5,313,068 A | 5/1994 | Meiri et al. |
| 5,384,912 A | 1/1995 | Ogrinc et al. |
| 5,808,623 A | 9/1998 | Hamburg |
| 6,097,855 A | 8/2000 | Levien |
| 6,128,417 A | 10/2000 | Ausbeck, Jr. |
| 6,473,475 B1 | 10/2002 | Putzeys |
| 6,532,037 B1 | 3/2003 | Shimura |
| 6,595,639 B1 | 7/2003 | Ho et al. |
| 6,728,433 B1 | 4/2004 | Bowers et al. |
| 6,813,590 B1 | 11/2004 | Crusius |
| 2001/0013872 A1 | 8/2001 | Genba |
| 2002/0085000 A1 | 7/2002 | Sullivan et al. |
| 2003/0025713 A1 | 2/2003 | Wang et al. |

(Continued)

OTHER PUBLICATIONS

Knuth, D., "The Art of Computer Programming," Stanford University, 2nd Edition, vol. 2, pp. 467, 496 and 640.

(Continued)

*Primary Examiner*—Jingge Wu
*Assistant Examiner*—Tsung-Yin Tsai
(74) *Attorney, Agent, or Firm*—Sughrue Mion, Pllc.

(57) ABSTRACT

A system and method for representing a two-dimensional spatial transformation that describes the transformation by an inverse mapped grid data set. The grid data for each coordinate is surface fitted on an array of rectangular patches defined in the output space using numerical techniques. Error analysis determines whether a finer mesh resolution is required for surface fitting. The spatial transformation is then defined by the array of rectangular surface patches and the set of surface coefficients such that the spatial transformation can be executed through evaluation of the surface polynomials. The two-dimensional surface polynomial representation allows the transformation to be easily adjusted for scale changes and zooming and panning effects.

44 Claims, 7 Drawing Sheets

U.S. PATENT DOCUMENTS

| | | |
|---|---|---|
| 2003/0053669 A1 | 3/2003 | Suri et al. |
| 2003/0103212 A1 | 6/2003 | Westphal et al. |
| 2003/0133602 A1 | 7/2003 | Bani-Hashemi |
| 2003/0165262 A1 | 9/2003 | Nishikawa et al. |
| 2003/0236675 A1 | 12/2003 | Duan |
| 2004/0109615 A1 | 6/2004 | Nakamura |
| 2004/0169724 A1 | 9/2004 | Ekpar |

OTHER PUBLICATIONS

The following three notices (1)-(3) are PCT notices in the corresponding PCT Application No. PCT/US04/29394.

(1) Notification of Transmittal of the International Search Report and the Written Opinion of the International Searching Authority, or the Declaration.

(2) International Search Report.

(3) Written Opinion of the International Searching Authority.

SYSTEM AND METHOD FOR REPRESENTING A GENERAL TWO DIMENSIONAL SPATIAL TRANSFORMATION

FIELD OF THE INVENTION

This invention relates to digital image data transformations, and more particularly to the representation of two-dimensional spatial transformation of digital image data.

BACKGROUND OF THE INVENTION

Most image processing systems can be considered in part as a spatial transformation system. In two-dimensional (2D) image processing, an image is generated by assigning a "color" value to every pixel in the 2D output space according to that pixel's relationship to some input data (possibly 3D). Introducing a coordinate system on the input and output data spaces, this relationship is conveniently expressed as a spatial mapping. The spatial mapping may be implicit in the design of the image processing system (lens arrangement, etc.), or may be explicitly specified to obtain a certain effect. Image warping, a term referring to a mapping between 2D input and output images or spaces, is often applied to correct optical distortions and various artifacts, such as aberrations, that are common in image capture and image display devices. Other uses of image warping include special effects, animation, image stitching and general geometric transformations. In general, image warping need not be a spatial transformation, however, the emphasis here is on spatial mappings.

Many electronic image distortion or transformation algorithms are designed with the primary goal to simplify the hardware implementation. This objective often leads to restrictions on the complexity of the spatial transformation or unrealistic descriptions of the transformation. For example, a method often used in image warping is the two-pass method. Specific warping systems based on the two-pass method include the Ampex device detailed in U.S. Pat. No. 4,472,732 to Bennett et al. The method disclosed is well suited for hardware implementations of real-time image processing systems and decomposes a 2D map into a series of 1D maps, which require only 1D filtering or re-sampling. Re-sampling in 1D is much simpler than in 2D and allows high optimization of the hardware using various architectures. However, the two-pass method is prone to the bottle-neck effect, i.e. large compression in intermediate image, leading to loss of data. In the extreme case, complete data loss can occur, e.g. where an area is compressed to a line. This effect restricts the type of geometric transformations that can be applied. Other problems with the two-pass method involve generating the intermediate pass data.

Various enhancements to the two-pass method have been attempted in order to resolve these issues, as discussed in U.S. Pat. No. 5,175,808 to Sayre and U.S. Pat. No. 5,204,944 to Wolberg et al., these methods are based on a pixel-by-pixel description (i.e. look-up tables). A pixel-by-pixel description requires large storage spaces and more importantly, does not allow simple means for additional data manipulations. Once an image is warped, a second transformation, say a zoom operation, may be needed. In a pixel-by-pixel description, the entire grid has to be re-generated for a zooming warp, which can be inefficient, especially if zooming is a feature that is regularly used.

Other algorithms for spatial transformations, not necessarily based on the two-pass method, are limited to certain mapping types, such as rotations, linear scaling, affine, and perspective transforms as described in U.S. Pat. No. 4,835,532 to Fant, U.S. Pat. No. 4,975,976 to Kimata et al., U.S. Pat. No. 5,808,623 to Hamburg, and U.S. Pat. No. 6,097,855 to Levien. Some prior art methods also tend to identify the mathematical coordinate spaces with the physical memory spaces, which means that in a hardware implementation the transformations are restricted by the organization of the memory structure. Furthermore, most warping algorithms do not provide a simple format for applying independent transformations to different parts of an image. Complicated mappings, such as a change in topology (e.g. from circular image to rectangular image), require independent mappings for different regions.

These limitations can be eliminated using 2D representations, i.e. single-pass, making use of 2D filtering. Examples of systems based on 2D representations include the video processor and display unit of U.S. Pat. No. 5,384,912 to Orginc et al. and the integrated circuit TMC2302A manufactured by Fairchild Semiconductor. However, these prior art methods are based on a restricted subset of 2D transformations, hence they cannot represent general 2D mappings. In particular, neither of these systems provides the means for applying independent transformations to different parts of a single image.

SUMMARY OF THE INVENTION

The present invention provides in one aspect, an electronic system for implementation of a two dimensional image transformation in a single pass, the transformation transforming an input image having input pixel coordinates, to an output image having output pixel coordinates, said system comprising:

(a) a geometry input interface for obtaining geometric parameters that define the transformation and which include lens parameters describing display optics, projection angles, display panel geometry for flat screen and curved screen, and user specified parameters;

(b) a grid transformation generator, coupled to said geometry input interface, for generating a grid data transformation that maps the output pixel coordinates onto the input pixel coordinates;

(c) a patch geometry generator, coupled to said grid transformation generator, for dividing the output pixel coordinate space into a number of corresponding patches according to an underlying geometry, each patch having an associated grid data set, said patch geometry generator determining the boundaries of the output space patches;

(d) a surface function estimator, coupled to said patch geometry generator, to parameterize the grid data set for each patch as a surface functional represented by surface coefficients; and (e) an output interface coupled to the surface function estimator to store the surface coefficients.

In another aspect, the present invention presents a method for representing a two dimensional image transformation to perform in a single pass, said transformation transforming an input image having input pixel coordinates to an output image having output pixel coordinates, said method comprising:

(a) obtaining geometric input parameters that define the transformation and that include lens parameters describing display optics, projection angles, display panel geometry for flat screen and curved screen, and user specific parameters;

(b) generating a grid data transformation based on said geometric input parameters, to map the output pixel coordinates onto the input pixel coordinates;

(c) dividing the output pixel coordinate space into a number of corresponding patches according to an underlying geometry, each patch having an associated grid dataset and determining the boundaries of the output space patches;

(d) parameterizing said grid data transformation, in each of the patches, as a surface functional represented by surface coefficients; and storing said surface coefficients.

Further details of different aspects and advantages of the embodiments of the invention will be revealed in the following description along with the accompanying drawings.

DETAILED DESCRIPTION OF THE INVENTION

Figure 1:
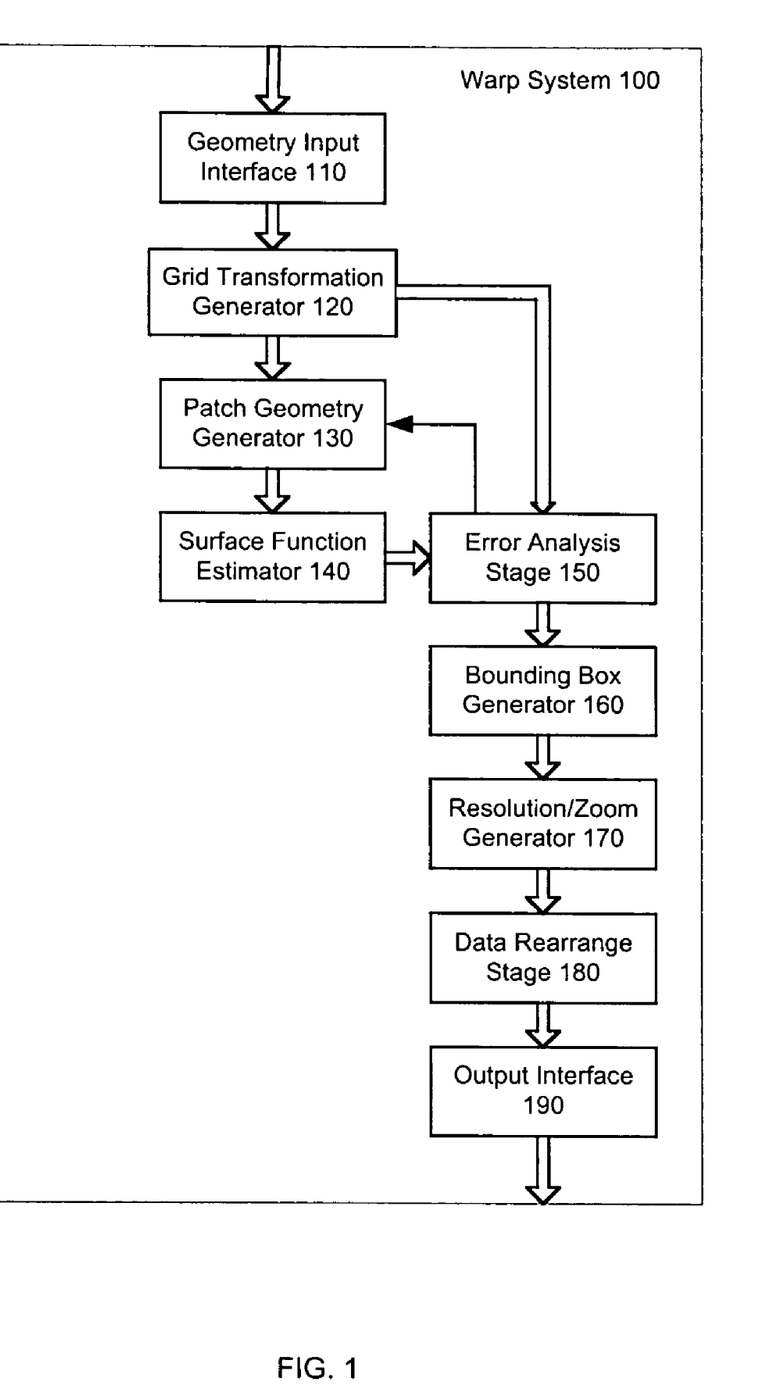
FIG. 1 is a block diagram of a warp system built in accordance with a preferred embodiment of the present invention.

Reference is first made to FIG. 1 which shows an example of a warp system 100 made in accordance with a preferred embodiment of the present invention. Warp system 100 includes a geometry input interface 110, a grid transformation generator 120, a patch geometry generator 130, a surface function estimator 140, an error analysis stage 150, a bounding box generator 160, a resolution/zoom generator 170, a data rearrange stage 180, and an output interface 190.

Warp system 100 transforms a grid data (pixel-by-pixel) representation to a surface functional representation, which results in an efficient real-time hardware implementation. Any system where a 2D spatial transformation needs to be applied can make use of warp system 100. Warp system 100 can be used in applications ranging from correcting small distortions in projectors, cameras, and display devices, to correcting for perspectives like keystone or special wide-angle lens corrections, and to a complete change in image geometry such as forming rectangular panoramas from circular 360 degree images, or other rectangular to polar type mappings.

Geometry input interface 110 obtains or contains a description of the transformation in terms of a small number of geometric parameters. These parameters provide a description of (i.e. a definition of) the transformation at the highest level. Examples include describing a keystone transformation in terms of the projection angles and lens throw ratio, or describing a lens correction in terms of a radial cubic polynomial function (here the parameters are the four polynomial coefficients), or describing a display surface in terms of its curvature radius. In the extreme case, where a closed description in terms of small geometric parameters is not available, it may be necessary to use a numerical description giving the mapping of a small subset of points.

Grid transformation generator 120 is coupled to the geometry input interface 110. Grid transformation generator 120 uses the input geometry parameters obtained from geometry input interface 110 to produce a grid data description of the spatial transformation that defines the corresponding geometric mapping and provides the new pixel positions after the transformation is applied. Grid transformation generator 120 uses an inverse mapping transformation, that is, a spatial transformation that specifies where each pixel in the output image is mapped onto the input image. This approach ensures that every output pixel within the horizontal/vertical scan-lines at the output is assigned a value in the order that it is processed. Forward mapping, on the other hand, as is conventionally known can leave "holes" in the output image with unassigned pixels.

Figure 2:
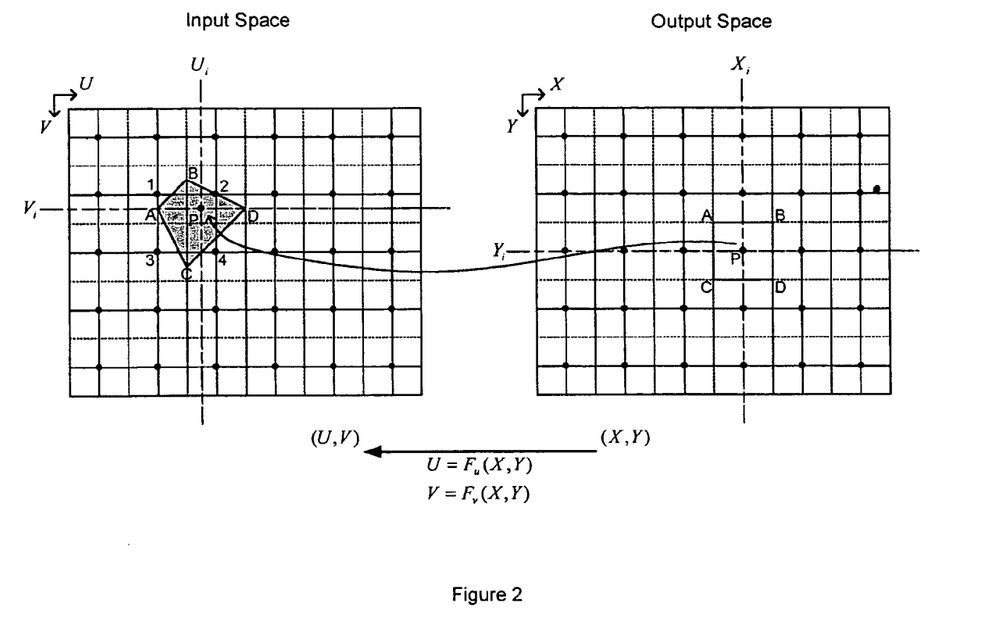
FIG. 2 is a graphical representation of a general 2D transformation where an inverse map is applied to pixels in the output image (P) to determine the position of the corresponding pixels in the input image (P')

Referring now to FIG. 2, there is illustrated a graphical representation of a general 2D transformation as an inverse map applied to a pixel P in the output image coordinate space to obtain a pixel P' in the input image in an input coordinate space. A general warp will map a point to a non-integer position in the input coordinate spate. Pixels are often modeled as having a finite area instead of as mathematical points, as shown by the dotted squares surrounding each lattice point. Thus, pixel P in output space is treated as the square ABCD, which is warped to an arbitrary shape ABCD surrounding P' in the input coordinate space. In the input space, pixel P' can be seen to overlap pixels 1, 2, 3 and 4.

As shown in FIG. 2, the origin for the input space and that of output space are defined to be at the top left corner of each corresponding image, with positive-x to the right and positive-y pointing down. Input and output images are generally stored or written to some form of memory, hence this disclosure will occasionally refer to the input image space and output image space as input and output memory spaces. In general, the grid data description can be summarized by the following formal equations:

$$U=F_u(X,Y)$$

$$V=F_v(X,Y) \quad (1)$$

These equations state that a pixel in the output image, with coordinates (X,Y), is mapped via the spatial transformation $F=(F_u,F_v)$, to a pixel in the input image, with coordinates (U,V). Accordingly, the grid dataset relation $\{(U_i,V_i),(X_i,Y_i)\}$, or simply grid dataset, is a set of pixels $\{(X_i,Y_i)\}$ in the output space, which are inversely mapped onto the pixels $\{(U_i,V_i)\}$ in the input space. As discussed, the coordinates $\{X,Y,U,V\}$ are coordinates in a physical memory address space. This relationship is expressed below:

$$(U, V) \xleftarrow{F} (X, Y) \quad (2)$$

$$\text{Input Memory Space} \xleftarrow{F} \text{Output Memory Space} \quad (3)$$

There are two common conventional approaches to defining a spatial transform. First, explicit functional forms for the mappings ($F_u, F_v$) can be known or can be constructed, meaning that we have an explicit mathematical model for the spatial transformation. Second, the grid dataset relation $\{(U_i, V_i),(X_i, Y_i)\}$, gives the input pixel positions $(U_i, V_i)$ corresponding to the output pixel positions $(X_i, Y_i)$, which could be known or could be constructed for part or all of the output space. The output positions $(X_i, Y_i)$ are integer values, usually consisting of a regular sampling of the output memory space, whereas the mapped input pixel positions $(U_i, V_i)$ are generally non-integer as shown in FIG. 2. The mathematical model is usually associated with a description in terms of a small number of geometric parameters at geometry input interface 110, whereas the grid datasets are associated with a numerical description in terms of a small number of points. Since in the mathematical model approach, the mappings can always be evaluated to obtain a grid dataset, the second approach is more universal.

The grid dataset relation model is considered to be the "ideal" representation of the spatial transformation (In practice, the grid data may contain noise, in which case "ideal" is itself an approximation). This description may be very complicated however, with the dataset (or functions) varying greatly from one region of the image to another. An image transformation system based directly on such a representation is hard to implement in software or hardware. When the grid dataset $\{(X_i, Y_i)\}$ or grid dataset relation $\{(U_i, V_i),(X_i, Y_i)\}$ spans the entire output space, the grid data components are essentially equivalent to a pixel-by-pixel representation. In this sense, the use of grid datasets in representing 2D spatial transformations is implicit in any prior art technique that uses a pixel-by-pixel (lookup/displacement tables) description. However, a pixel-by-pixel representation is inefficient for hardware implementation. Warp system 100 of the present invention transforms a grid data (pixel-by-pixel) relation representation to a surface functional representation.

A simplification often made prior to functional representation is to separate the data for a two-pass processing. As is conventionally known, the main benefit of using a separation is that the corresponding hardware implementation is simplified. Separating the scaling data into vertical and horizontal passes (or datasets), allows for the use of 1D filtering. However, this sacrifices image quality and, in addition, not all mappings can be separated. Given the current advances in memory space and speed, efficient single-pass implementations of 2D filtering can now be implemented. One example of such implementation is the sxT2 chip (manufactured by Silicon Optix Inc. of San Jose, Calif.). Thus the prior art hardware advantages from separation of two-pass processing are replaced by the more important goals of maintaining image quality and transformation flexibility. The method of this invention does not use separation, yet it allows an efficient hardware implementation and retains full flexibility to represent general 2D mappings. As the method is single-pass, the resulting image quality (when using a 2D filter) is superior to that of a two-pass method.

In order to fully appreciate the usefulness of the present invention, it is important to understand scan-line processing that is commonly used to evaluate the 2D transformation at the output space in order to simplify the hardware processing. The transformation could be a two-pass as in the prior art, or a single-pass as in the present invention. In scan-line processing, output pixels are generated sequentially along rows (horizontally) and/or columns (vertical). After a row/column is fully generated, processing proceeds to the next row/column. A variation on scan-line processing is to first process a section of each row/column, say section 1, then return to process section 2 (after section 1 has been processed for each row/column), and so forth. This variation combines scan-line processing in both directions. Scan-line processing at the output does not limit the type of processing applied to input image data. In particular, one can use 2D filtering.

The main limitation of using scan-line processing at the output is that memory access (of pixel data needed in filtering) at the input can be random. Nearby pixels in the output space (which are processed nearly one after the other) may need data in the input space that is spread out over a large region, making input memory access inefficient. This can be a problem in filtering (leading to slower processing and longer time delay) but not so in evaluating the surface polynomials describing the transformation, which is the focus of the present invention. In the present invention, the surface polynomials are defined on the output space and do not need access to input pixel data.

For scan-line processing, a spatial transformation needs to be defined for all pixels in the output space. This means going from a dataset description to a functional description that best approximates the ideal mapping for every pixel (recall that for the sampled pixels, the ideal mapping is given by the known grid dataset relation). For regions where a mathematical model is not well defined, a functional description may extrapolate the well-defined data or map such regions to background. This latter behavior is acceptable since ill-defined regions for a mathematical model always correspond to background pixels.

Figure 3:
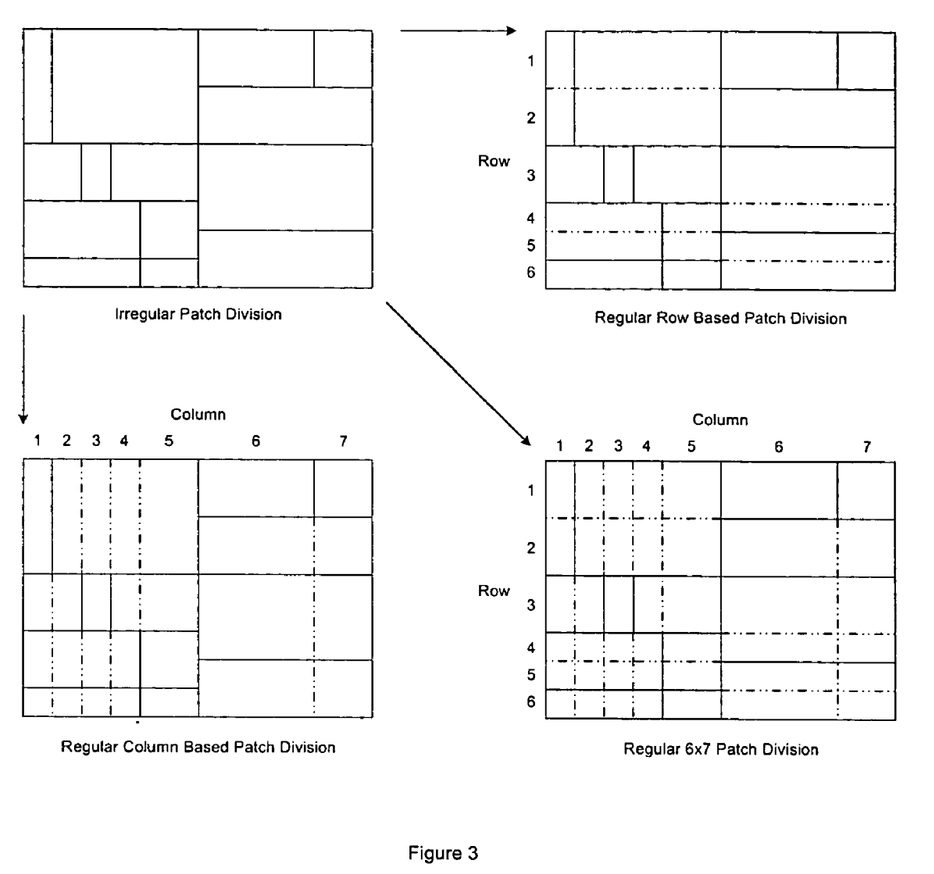
FIG. 3 is a schematic diagram illustrating examples of how irregular and regular patch divisions are made regular within the system of FIG. 1 by extending the patch boundaries to form rows of patches, columns of patches or an array of patches.

FIG. 3 illustrates the function of patch geometry generator 130. Patch geometry generator 130 generates an array of rectangular patches, which are defined in the output space (FIG. 2), on which data is to be surface fitted. The patches do not have to be the same size but should fit together in a regular manner in this particular implementation. The term "regular" in this context is intended to mean that the patches can be arranged into rows and/or columns. This is not restrictive since any division by rectangular patches can be brought to a regular arrangement. Both regular and irregular patch divisions are shown in FIG. 3. The number of patches is determined by the complexity of the warp, tolerance level for fitting errors (discussed below), type of basis functions being used for the fitting and any implementation constraints. In principle, a patch can be assigned to every set of four adjacent pixel points, however, this would require a large amount of memory to store the spatial transformation.

Coupled to patch geometry generator 130, is surface function estimator 140, which generates a functional description of the grid transformation. The method commonly used to obtain a functional description of a spatial transformation is to fit the grid data on a subset of scan-lines, vertically and/or horizontally. The fitting is usually least squares based, with the basis functions often being polynomials. The disadvantages of fitting scan-lines are that: (a) large amounts of data need to be stored, that is, one set of polynomial coefficients for every scan-line fitted, and (b) by fitting individual scan-lines the global description of the warp between scan-lines is lost. In particular, if scan-lines are not fitted for every pixel row or column, which is often the case due to memory restrictions, an interpolation needs to be performed to obtain grid data between scan-lines. Any form of interpolation, which does not take into account the global description of the warp, leads to errors in the pixel positions, which can be quite large depending upon the severity of the warp.

Both these problems can be resolved by surface fitting the grid data for both coordinates. Surface fitting, which applies to both single-pass and two-pass methods, is the natural way of describing a 2D spatial transformation. It gives an accurate description that simultaneously incorporates the geometric behavior in both directions. Surface fitting, when achieved by the polynomial method, means to fit the polynomial coefficients that describe the single direction scan-line fitting. Although a surface gives a full 2D description of the mapping, the evaluation of the surface can still proceed in a scan-line order, vertically or horizontally. Thus a surface based description can also be implemented using an efficient scan-line algorithm.

Referring now to FIG. 1 and FIG. 3, surface function estimator 140 fits the grid data for each rectangular patch to a surface using a chosen basis set as will be described. It should be noted that this process assumes that the data is not multi-valued, that is, no folding is present. For real-time hardware implementations, the most common fitting choice is a $3^{rd}$ order polynomial surface in both x and y. Surface fitting will give functional approximations to the ideal dataset relation $\{(u_i,v_i),(x_i,y_i)\}$. The surface functions are denoted as $u_i=S_{nu}(x_i,y_i)$, and so forth. The origin in the output coordinate space is chosen to be a relative origin that is re-defined for every patch. This means that we can take, for example, the origin to be defined at the top left corner of every patch. This decreases the range of the numbers involved in the fitting and surface evaluations, which is important in reducing numerical errors, especially in hardware arithmetic units.

A more detailed description of the particular implementation of a polynomial based approach will now be discussed. Polynomial functions (terms of the form $x^i y^j$) are the most common non-trivial functions used in hardware implementations. Any polynomial based surface, such as a B-spline surface, can be brought to this form. The following notation will be used for the various fitted surfaces:

$$u_{ic} = S_{nu}(x_i, y_i) = \sum_{k=0}^{K} \sum_{l=0}^{K} S_{nu,kl} x_i^k y_i^l \quad (4)$$

$$v_{ic} = S_{nv}(x_i, y_i) = \sum_{k=0}^{K} \sum_{l=0}^{K} S_{nv,kl} x_i^k y_i^l$$

Here, the coordinates on which the surfaces are evaluated span the entire patch, and not merely the sampled pixels in the datasets (the subscript c denotes computed). The orders of the surface are K in the x-direction and L in the y-direction, which can be different. The surface coefficients $\{S_{nu,kl}, S_{nv,kl}\}$, which are obtained from the fits, uniquely define the surfaces on all patches.

Surface fitting makes the transition from a grid-based representation, i.e. $\{(u_i,v_i),(x_i,y_i)\}$, to a surface polynomial (functional) based representation (for patch n ), such as:

$$u = S_{nu}(x, y) = \sum_{k=0}^{K} \sum_{l=0}^{L} S_{nu,kl} x^k y^l,$$

and similarly for v, as discussed above. Instead of storing the numerous grid data relation points $\{(u_i,v_i),(x_i,y_i)\}$, only the surface coefficients $S_{nu,kl}$ need to be stored (i.e. for all surfaces/patches). The surface can then be evaluated to determine the inverse mapped pixel positions. The fitting procedure determines the surface coefficients. Different methods and fitting functions can be used to fit the data, but the most commonly used is the Least Squares method for fitting.

Figure 4A:
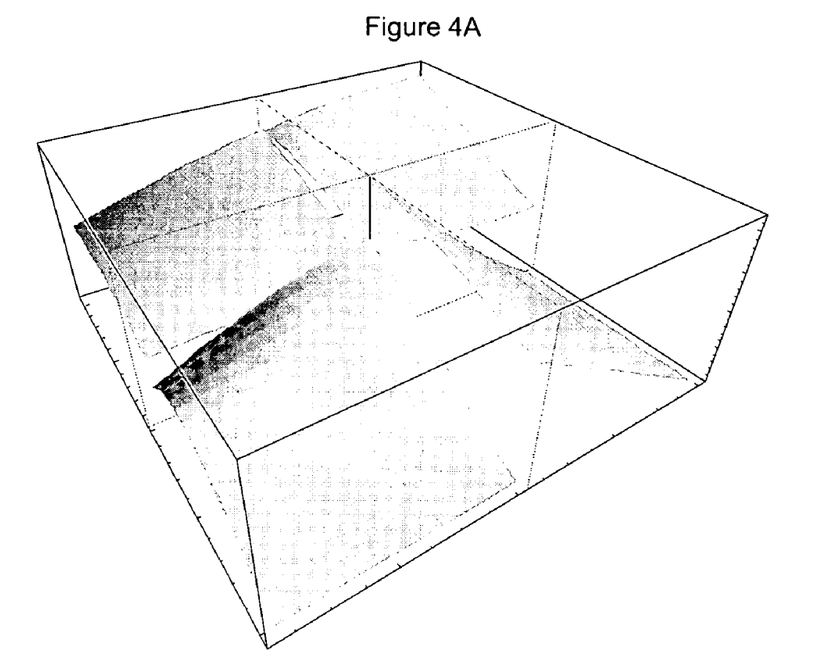
FIGS. 4A and 4B are graphical representations of discontinuous (FIG. 4A) and continuous (FIG. 4B) 2D surfaces that are utilized within the system of FIG. 1.
Figure 4B:
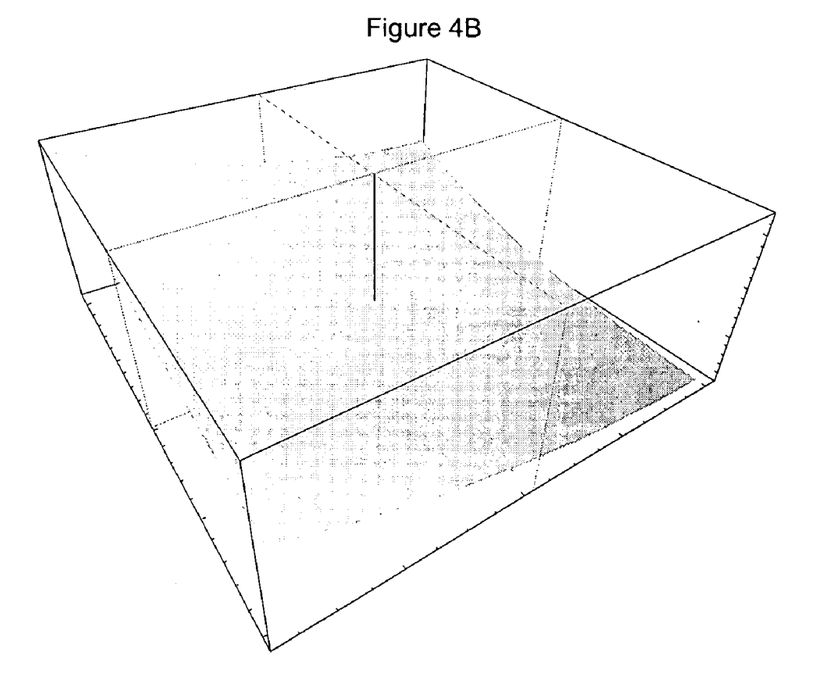

FIG. 4 illustrates two examples of 2D fitted surfaces generated by the surface function estimator 140, based on the division of the output coordinate space into an array of four rectangular patches. Here, the surface shown in FIG. 4A is discontinuous, whereas the surface shown in FIG. 4B is continuous—allowing for discontinuity will be further discussed below.

Once the surfaces are obtained, for each output coordinate point in the 2D dataset, error analysis stage 150 evaluates the relevant surface functions to obtain the $u_{ic}$ and $v_{ic}$ values. Error analysis stage 150 compares these values with the exact coordinate $(u_i,v_i)$ from the 2D grid description, which it receives independently from grid transformation generator 120. It then determines whether a pre-determined error tolerance level condition ($|u_{ic}-u_i|,|v_{ic}-v_i|$) has been satisfied. If the preset tolerance level conditions are not satisfied, error analysis stage 150 sends the results of the error analysis back to patch geometry generator 130. Based on these results, patch geometry generator 130 further subdivides the patch geometries. Only those patches where the errors are larger than the tolerance level are subdivided. The subdivision of the patches maintains the regularity of a rectangular array. A prime candidate patch for subdivision is one that contains a large amount of background. Often the fitting errors are large for those pixels mapping to the background, outside of the input coordinate space. In this case, those points should be associated with a separate patch and fitted in a manner that maps them to the background. The relevant non-background regions can be then fitted independently. These steps are repeated until the desired accuracy is obtained. It should be noted that the surface functions are not changed for a given implementation.

The process of optimizing the patch geometry, in implemented examples of the present invention, is done via gradient search and/or random search. The search is made in the vector space of the patch boundary positions. For an M×N array of patches, there are M+1 y boundaries (vertical) and N+1 x boundaries (horizontal), giving a dimensionality of M+N+2 for the vector space.

In a gradient search, a starting configuration (vector) of patch boundaries is chosen, denoted $\overline{b}_0$, along with a step vector, denoted $\overline{\Delta}_0$. A fit and error analysis is made for both $\overline{b}_0$ and $\overline{b}_0+\overline{\Delta}_0$. If the error at $\overline{b}_0+\overline{\Delta}_0$ is smaller, then $\overline{b}_0+\overline{\Delta}_0$ is retained and the process is repeated with $\overline{b}_0+\overline{\Delta}_0$ and $\overline{b}_0+2\overline{\Delta}_0$. If the error is equal or larger, then $\overline{b}_0$ is retained and a new step vector is selected $\overline{\Delta}_1$; the process is then repeated with $\overline{b}_0$ and $\overline{b}_0+\overline{\Delta}_1$. The step vectors can be adjusted based on the change in the error. For large changes, larger magnitude steps are used; for small changes smaller magnitude steps are used. Patch geometry generator 130 makes sure to search all possible directions in the vector space to ensure that the search is not stuck at a local error minimum. The number of iterations used is dependent on the time allowed for the search. The gradient search is performed for all applicable patch array numbers, i.e. for 1×1 patch array, 1×2 patch array, 2×1 patch array, etc., up to a predetermined maximum arrangement.

The random search randomly selects boundary vectors $\overline{b}_{Ri}$ from the vector space of patch boundaries. These vectors can be selected subject to various constraints, such as enforcing minimum/maximum patch size, etc. Errors are computed for fits of the vectors $\overline{b}_{Ri}$, with the one vector giving the minimum error being retained. The search is, as with the gradient search, made for all possible patch array numbers. It has been benchmarked in one example of the present invention that for most transformations, as explained below, 20 iterations are sufficient to obtain a 10 times reduction in error (for a given patch array number).

In another example of the present invention, an efficient and robust approach to error reduction involves combining the gradient and random search. The random search is first used to obtain a vector, $\overline{b}_{Rn}$, minimizing the error. This vector is then used as the starting vector for the gradient search, $\overline{b}_0 \equiv \overline{b}_{Rn}$. Here the gradient search serves to further refine the results obtained by the random search. Several random/gradient (combined) searches can be used to ensure that the patch boundary space has been thoroughly explored for an error minimizing patch geometry.

Some important points regarding the above surface representation need be emphasized. If necessary, each patch can be treated as an independent output coordinate space, and the dataset for that patch as an independent 2D transformation in itself. In particular, each patch can be independently fitted, which implies that the output images need not be continuous. Examples of discontinuous and continuous surface fits on patches are shown in FIG. 4A and FIG. 4B. The four patches shown in FIG. 4A can be further divided to improve the fitting. Specifically, the 1024×768 x-y output space has been divided into four patches and the surface (u(x,y)) has been plotted. In FIG. 4A, the surface is discontinuous across patches. Each patch has an independent dataset, which is fitted independently of the neighboring datasets. In FIG. 4B the surface is continuous across patches and in this case, the fits on any patch need ensure continuity.

For the more common situation of maintaining continuity of the image across patch boundaries, basis functions that explicitly allow or impose continuity constraints can be used. The most well known functions for controlling continuity in 2D are the B-spline and Bezier surfaces. Both types of surfaces can be used to obtain a required degree of continuity (in the mathematical sense of $C^i$ continuous functions). For B-splines, surface fits on an M×N array of patches can be done using a tensor product approach, with the patch divisions easily obtained from the spline knots or vice-versa. By adjusting the knot sequence, one can easily control the continuity of a B-spline surface. With a bi-cubic B-spline, one can impose up to $C^2$ continuity, which is sufficient for all purposes. (Usually $C^1$ is all that is needed for obtaining smooth images.) Discontinuous surfaces, i.e. independent patches, are seen as special cases of B-splines, with the appropriate knot sequence. Splines can also be written in a local polynomial form (on each patch) with a relative origin, which translates naturally into a polynomial based hardware implementation. Tools for B-spline fitting are available with many numerical/mathematical computation software packages. Furthermore, every independent patch can be associated with different operations. A patch based surface description (of arbitrary continuity across patch boundaries) allows the representation of very complex 2D spatial transformations.

The complete representation of a general 2D spatial transformation is given by the following data, which applies to every patch:
1) Geometry of the patch (absolute position of patch origin, patch size)
2) Surface coefficients describing surface fit to grid data relation This representation provides a unified format for defining 2D mappings. The representation is geared towards real-time hardware implementations of 2D image transformation systems. In a hardware implementation, the surface polynomials will be evaluated in scan-line order, with the position and derivative information being passed to a processing filter. (The derivative is easily extracted from the position surface.) Since the mappings are given in closed functional form, full geometric data (various order derivatives) is readily available for a filtering stage.

As the complexity of the map increases, the number of patches, and hence the amount of data contained in the (1) and (2) representation above increases. The data scales to the complexity of the mapping, without any changes to the overall format. An increase in the number of patches will also serve to reduce fitting error. In principle, the maximum fitting error can be reduced to an arbitrary small level by continuously subdividing the patch array. However in practice, restrictions on how much space (memory) is available to store the data (each patch has associated with it data components (1) and (2)), will limit the number of patches. Balancing memory requirements versus error minimization (tolerance level) will determine the final patch array size.

Most 2D transformations of practical interest do not require a high-resolution patch mesh. To quantify these size and error issues, several 2D mappings were studied using the above format. They included (i) common lens distortions, such as the radial pincushion and barrel distortions, (ii) projection maps, such as the vertical/horizontal keystone correction and projecting onto curved surfaces, (iii) rotations combined with linear scaling, (iv) combinations of the above; to more complicated maps such as (v) arc raster maps, (vi) correcting wide-angle/360 degrees/panoramic images (obtained using fisheye lenses or special 360 degrees imaging systems).

A polynomial surface of degree 3 (K=L=3) was used, which implies 16 surface coefficients per patch. An error limit of 0.5 pixels was set. For the transforms (ii)-(iv), a maximum of four patches were needed. This amounts to <=128 surface coefficients to define the entire map. If a surface coefficient is stored as a four-byte float, the data size amounts to <=512 bytes. This is a very reasonable number and it is easily accommodated by on-board/on-chip memories.

For transforms (i) and (v), a maximum total (for both coordinates) of 26 patches were needed, giving a data size of <=1.625 Kbytes, again easily handled by current on-board/on-chip memories. For transform (vi), a perspective correction to a wide 90 degrees field of view requires a maximum total of 18 patches, or <=1.125 Kbytes. If the full functionality of the representation is used, then complicated transformations can be applied to images obtained from (vi). For example, images from two 180 degrees fisheyes can be transformed to a stitched 360 panoramic view, plus, say two zoomed up 90 degrees views of specific regions, corrected for perspective. Such a transformation corresponds to approximately six maps (360/90+2), each transforming a specific 90 degrees region, which gives a data size of <=6.75 Kbytes. Such special wide-angle/360 based transformations have gained popularity in the recent years, especially in security applications. Accordingly, it is clear from these results that the method presented above is capable of representing general 2D transformations, with reasonable data sizes (sizes scale linearly with complexity) and sub-pixel accuracy.

Further hardware optimization can be achieved by complementing the image transformation data with bounding box data. Bounding box data, generated by the bounding box generator 160, serves to eliminate unnecessary hardware processing. As discussed above, large areas in the output space often correspond to background pixels (note that this applies to transformations that shrink the input image, which are the most hardware resource intensive when using 2D filtering). At these pixel positions, the surface does not need to be evaluated, nor does the filter need to be executed—all that is required is that the pixel color be set to the background color. To allow the hardware to quickly (i.e. without evaluating the surface) identify a large number of background pixels, each patch has associated with it a rectangular bounding box. The bounding box is simply defined by its top left, $(x_L^B, y_L^B)$, and bottom right coordinates, $(x_R^B, y_R^B)$, in the output space. Only those output pixels $(x_i, y_i)$ with coordinates within the bounding box, $x_L^B \leq x_i \leq x_R^B$ and $y_L^B \leq y_i \leq Y_R^B$, are processed (i.e. the surface is evaluated and the pixel has its color value determined by 2D filtering), whereas those outside the bounding box are simply assigned the background color. This eliminates many cycles of redundant processing.

Not all background pixels are identified in this manner, since the non-background pixel boundary is usually not rectangular. However, with a finer division of bounding boxes, possibly more than one box per patch, this boundary can be closely approximated with rectangular bounding boxes, at the expense of more storage (require for the bounding box coordinates). For most transformations, bounding box data is not necessary, and for the extreme transformations one bounding box per patch is sufficient.

If bounding box data is not used, a more standard approach can be used to eliminate unnecessary processing. In the standard approach, the surface is evaluated for all output pixels and a check is made to determine whether the resulting coordinates lie within the input space. If a coordinate is within the input space, then processing proceeds as normal, that is, the output pixel color value is determined by a 2D filtering. If the coordinates are outside, then the pixel is simply assigned the background color, and the 2D filter is not executed. Here, although the surface has to be evaluated, gains from the fact that the filter will not process these data can be considerable. In addition, the non-background pixel boundary can be very accurately determined, since this boundary is fully specified by the surface map onto the input space.

Image transformation of warp system 100 determines the full set of parameters describing the 2D image transformation. These data, in one implementation of the present invention, are used by resolution/zoom stage 170, and, then by data rearrange stage 180. Prior to these stages a mapping representation has been determined, at the output of bounding box generator 160, consisting of the underlying patch geometries and surface coefficients resulting from patch geometry generator 130 and surface function estimator 140.

Figure 5:
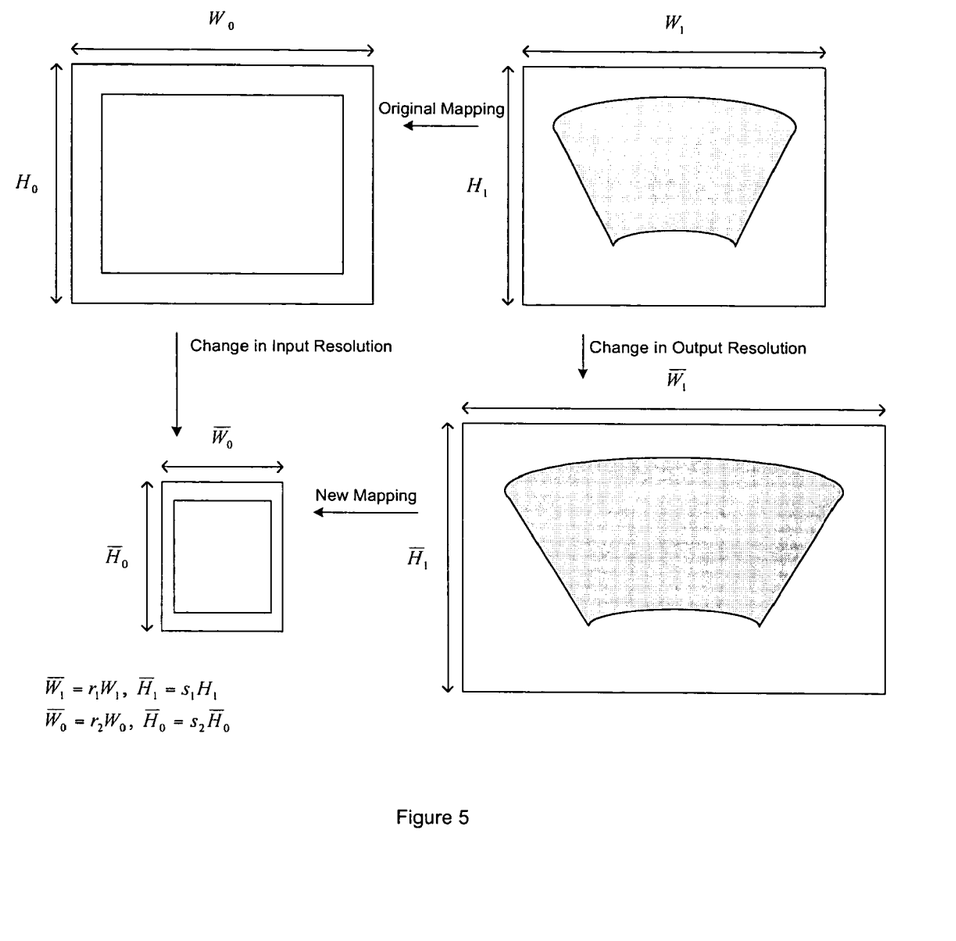
FIG. 5 is a schematic diagram illustrating how the system illustrated in FIG. 1 can be used to achieve a change of resolution where both the input and output images are scaled.
Figure 6:
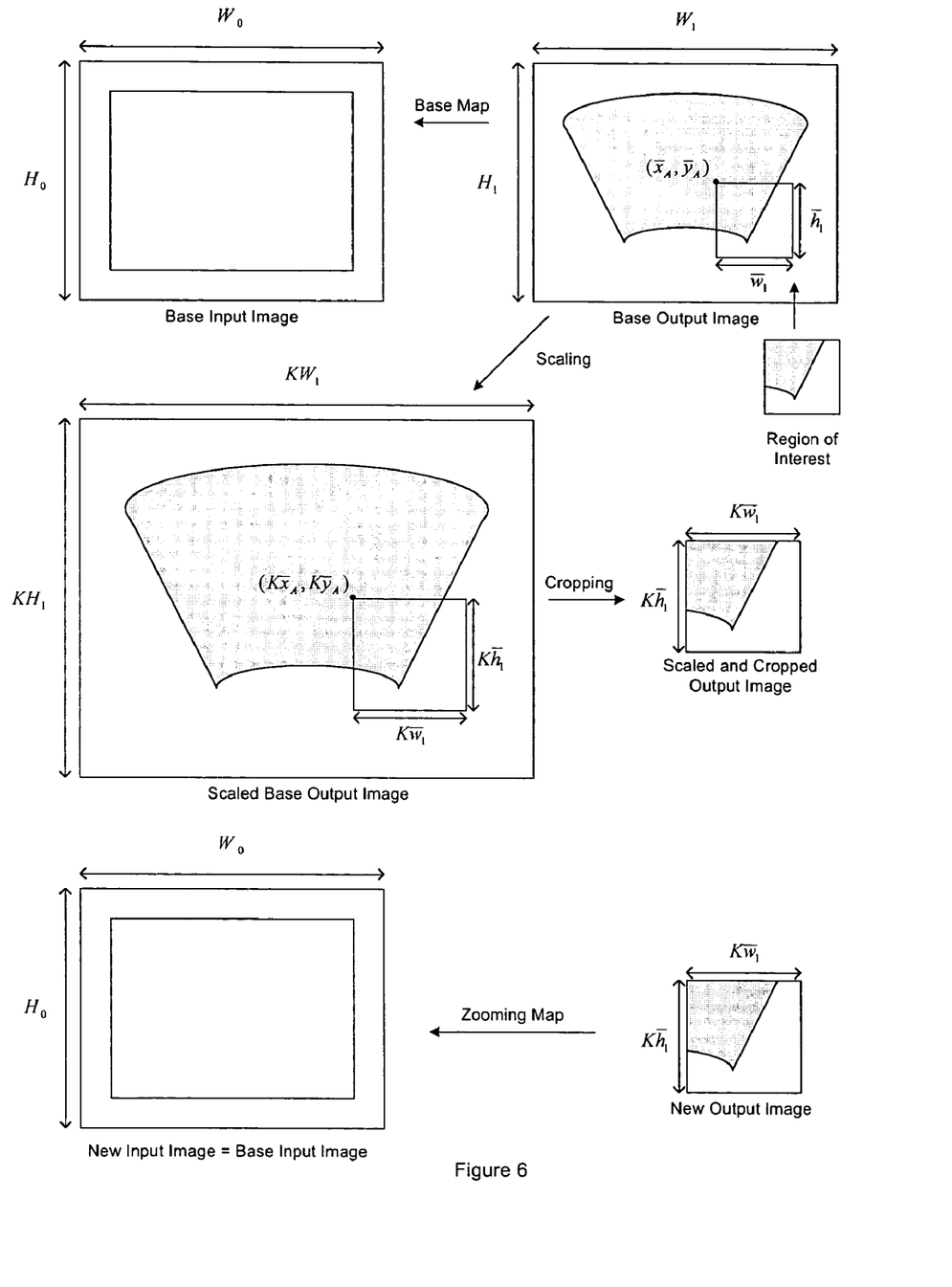
FIG. 6 is a schematic diagram illustrating how the system illustrated in FIG. 1 can be used to achieve a zooming map.

As shown in FIGS. 5 and 6, the resolution/zoom generator 170 can be used to provide resolution changes and zooming effects to the input/output image and utilize the image parameters discussed above. Using the position-based representation of image transformation of warp system 100, the spatial transformation can be easily adjusted for different resolutions by conducting a simple scaling of the coefficients. FIG. 5 illustrates the steps involved in a resolution change operation where both the input and output images are scaled. Independent scaling of the input/output coordinates can be expressed as:

$$x \to x' = r_1 x, \quad y \to y' = s_1 y$$

$$u \to u' = r_2 u, \quad v \to v' = s_2 v \quad (5)$$

The constants $\{r_1, s_1, r_2, s_2\}$ give the scaling factors and the prime denotes the scaled coordinates. In terms of the scaled coordinates, the surfaces can be expressed as:

$$v' = s_2 S_{nv}(x'/r_1, y'/s_1) = s_2 \sum_{k=0}^{K} \sum_{l=0}^{L} S_{nv,kl}(x'/r_1)^k (y'/s_1)^l \quad (6)$$

$$u' = r_2 S_{nu}(x'/r_1, y'/s_1) = r_2 \sum_{k=0}^{K} \sum_{l=0}^{L} S_{nu,kl}(x'/r_1)^k (y'/s_1)^l \quad (7)$$

Comparing with the standard form:

$$v' = \sum_{k=0}^{K} \sum_{l=0}^{L} S'_{nv,kl}(x')^k (y')^l \quad (8)$$

$$u' = \sum_{k=0}^{K} \sum_{l=0}^{L} S'_{nu,kl}(x')^k (y')^l \quad (9)$$

the new surface coefficients for the scaled transformation are:

$$S'_{nv,kl} = \frac{s_2}{r_1^k s_1^l} S_{nv,kl} \quad (10)$$

$$S'_{nu,kl} = \frac{r_2}{r_1^k s_1^l} S_{nu,kl} \quad (11)$$

Therefore, to adjust for a change in input or output resolution, all coefficients are scaled by a factor. This is a relatively simple operation with no re-fitting or interpolation needed. It should be understood, however, that the patch geometry (i.e. patch size and absolute position of patch origin) will also have to be appropriately scaled by warp system 100.

FIG. 6 illustrates the steps involved in generating a zooming map within image transformation performed by warp system 100. The Base Input Image, the Base Output Image and the Scaled Base Output Image show the base warp and the region that is to be zoomed. The zooming warp is generated by first scaling the base output image (i.e. generating the Scaled Based Output Image) and then extracting/cropping the region of interest (which has been zoomed appropriately by the scaling operation). The zooming map corresponds to the transformation shown between New Input Image and New Output Image. The zooming operation is similar to scaling for different resolutions with the difference that one can zoom in/out on a specific region, which implies a panning capability. A zoom operation may be defined on the input image space (pre-transform) or on the output image space (post-transform). In the following exemplary application of warp system 100, we discuss zooming on the output space. The zoom factor, K, shall be taken to be >1 (for K=2, we have a 2× zoom, etc.) The other cases are treated in a similar manner.

Consider a transformation, called the Base Map (FIG. 6), which transforms an input image of resolution $W_0 \times H_0$ to an output image of resolution $W_1 \times H_1$. A zoom operation on the output means that we want to zoom in on a rectangular region in the output space of the Base Map. This region is specified by giving its dimensions, $\bar{w}_1 \times \bar{h}_1$, and the absolute position of its top left corner, $(\bar{x}_A, \bar{y}_A)$. The output image in the new zooming map will have dimensions of $K\bar{w}_1 \times K\bar{h}_1$. A zoom operation can be broken into two steps. First the base output image is scaled by a factor of K, which amounts to the same operation as scaling to a new output resolution of $KW_1 \times KH_1$. Second, in the larger scaled image a window of size $K\bar{w}_1 \times K\bar{h}_1$, positioned at $(K\bar{x}_A, K\bar{y}_A)$, is extracted and displayed as the new output image. Thus, the scaled image is cropped, retaining only the region of interest. The zooming map is the 2D spatial transformation that maps the $W_0 \times H_0$ input image to the new scaled and cropped $K\bar{w}_1 \times K\bar{h}_1$ output image. The coordinate system on the new output space will be labeled as (x",y"). The notation (u",v") will be used for the new map's input coordinate system, which actually remains unchanged from the base-warp. Recall that the coordinates on each patch (in the output space) are defined relative to an origin at the upper left corner of each patch. In the computations below we will also need to work with absolute coordinates. The subscript A will denote absolute coordinates, e.g. $(x_A, y_A)$.

Mathematically, the first step in zooming is a multiplication operation, and the second step is a shift or addition operation. The absolute positions in the base and new output spaces are related by:

$$y_A'' = Ky_A - K\bar{y}_A$$

$$x_A'' = Kx_A - K\bar{x}_A \qquad (12)$$

or $$x_A = (x_A'' + \bar{x}_A)/K$$

$$x_A = (y_A'' + \bar{y}_A)/K \qquad (13)$$

Before these equations can be substituted into the surface expressions, we need to convert them into relative positions. This is less trivial, because the second step introduces additional complications not previously seen in the simpler resolution change operation. Shifting the origin in the scaled image and extracting a window of size $K\bar{w}_1 \times K\bar{h}_1$, will result in many pixels/points lying outside the output image. As far as the new warp is concerned, these points do not exist. Similarly, parts of patches or complete patches may lie outside the image window. This means that the patch divisions will be different for the zooming map. Only those patches, or parts of patches, which lie in the $K\bar{w}_1 \times K\bar{h}_1$ window should be retained. Which patches, or parts of patches, should be included can be found by studying the new (absolute) positions of the patch corners. Since we are starting with a regular mesh of rectangular patches and the windows are rectangular, the new patch division is also guaranteed to be regular rectangular.

The top left corner (denoted by an index of 1) and bottom right corner (denoted by an index of 2) of the nth patch in the base map are labeled as follows (these are absolute positions, though the subscript A is omitted to simplify notation):

$$\{(x1_n, y1_n), (x2_n, y2_n)\} \qquad (14)$$

These points are mapped to the following new corner points in the new spaces:

$$\{(x1_n'', y1_n''), (x2_n'', y2_n'')\} \qquad (15)$$

The new patch dimensions are given by:

$W(n) = \text{Minimum}(x2_n'', K\bar{w}_1) - \text{Maximum}(x1_n'', 0)$ (new patch width)

$H(n) = \text{Minimum}(y2_n'', K\bar{h}_1) - \text{Maximum}(y1_n'', 0)$ (new patch height) $\qquad (16)$ If either the new width or height for the patch is <=0, then the patch is excluded from the new map. If both the width and height are greater than zero, then the patch is included in the zooming transformation. The included patch's absolute position (i.e. the top left corner) needs to be re-computed, since the patch may be only partially included. The new positions are given by:

$$\bar{x}1_n'' = \text{Maximum}(x1_n'', 0)$$

$$\bar{y}1_n'' = \text{Maximum}(y1_n'', 0) \qquad (17)$$

Every patch that is retained has its new patch geometry (position and size) given by:

$$\{(\bar{x}1_n'', \bar{y}1_n''), W(n), H(n)\} \qquad (18)$$

Knowing the new patch geometries, equations (12) and (13) can be converted to the relative origin representation on the new output space (dropping the patch index):

$$x = \frac{1}{K}(x'' + \bar{x}l'' + \bar{x}_A - Kxl) \qquad (19)$$

$$y = \frac{1}{K}(y'' + \bar{y}l'' + \bar{y}_A - Kyl)$$

Lastly, these can be substituted into the surface expressions for the base map $$u'' = \sum_{k=0}^{K} \sum_{l=0}^{L} \frac{S_{nu,kl}}{K^{k+l}} (x'' + \bar{x}l'' + \bar{x}_A - Kxl)^k (y'' + \bar{y}l'' + \bar{y}_A - Kyl)^l \qquad (20)$$

$$v'' = \sum_{k=0}^{K} \sum_{l=0}^{L} \frac{S_{nv,kl}}{K^{k+l}} (x'' + \bar{x}l'' + \bar{x}_A - Kxl)^k (y'' + \bar{y}l'' + \bar{y}_A - Kyl)^l$$

Expanding equations (20), and comparing them with the standard form, the new surface coefficients can be extracted in a straightforward manner. These coefficients, combined with the patch geometries, completely define the zooming transformation.

Data rearrange stage 180 is utilized for specific image manipulation systems where the representation data needs be further rearranged. The evaluation of the surface polynomial can proceed in various ways, the details of which (such as number of additions and multiplications used and their order) depend on the hardware or software architecture. For example, a common hardware approach to evaluating polynomials is to use Horner's method (This implementation of the present invention uses $3^{rd}$ degree polynomials with a general notation):

$$ax^3+bx^2+cx+d=((ax+b)x+c)x+d \quad (21)$$

A similar technique can be used for evaluating the surfaces. A surface can be rewritten as:

$$S = \sum_{k=0}^{3} \sum_{l=0}^{3} S_{kl} x^k y^l \quad (22)$$

$$= \sum_{k=0}^{3} x^k (((S_{k3}y + S_{k2})y + S_{k1})y + S_{k0})$$

$$= \{ (((S_{33}y + S_{32})y + S_{31})y + S_{30})x^3 +$$
$$(((S_{23}y + S_{22})y + S_{21})y + S_{20})\}x +$$
$$(((S_{13}y + S_{12})y + S_{11})y + S_{10})\}x +$$
$$(((S_{03}y + S_{02})y + S_{01})y + S_{00})$$

The surface is treated as a polynomial in x, with the coefficients of the x-polynomial being polynomials in y. Every polynomial (5 in total) is evaluated using Horner's method. For every horizontal scan-line (row), the y-polynomials need to be evaluated only once (per patch). Expression (22) can also be used for vertical scan-lines. In this case, the y-polynomials should be evaluated and stored for the first vertical scan-line (column) of each patch. These can then be used for the remaining vertical scan-lines in the patch, for they are independent of the x-positions of the scan-lines. This increases processing speed and treats the transformation as 1D position polynomials directly dependent on x, with an implicit dependence on y, as expressed by the position coefficients themselves being polynomials of y. Alternatively the surface can be treated as a polynomial in y, with the coefficients of the y-polynomial being polynomials in x. Depending on the implementation, one or the other approach may be better suited to the specifics of the memory access/storage and arithmetic units.

Another standard technique for evaluating polynomial expressions is the use of forward differences. Forward difference evaluations are prone to accumulation errors however. Their main benefit is a reduction in hardware complexity (specifically reducing multipliers and the possibility of using fixed point). If the patch sizes are small in the scan line direction and reasonable bits of numerical precision are available, then the accumulation error may be small.

Figure 7:
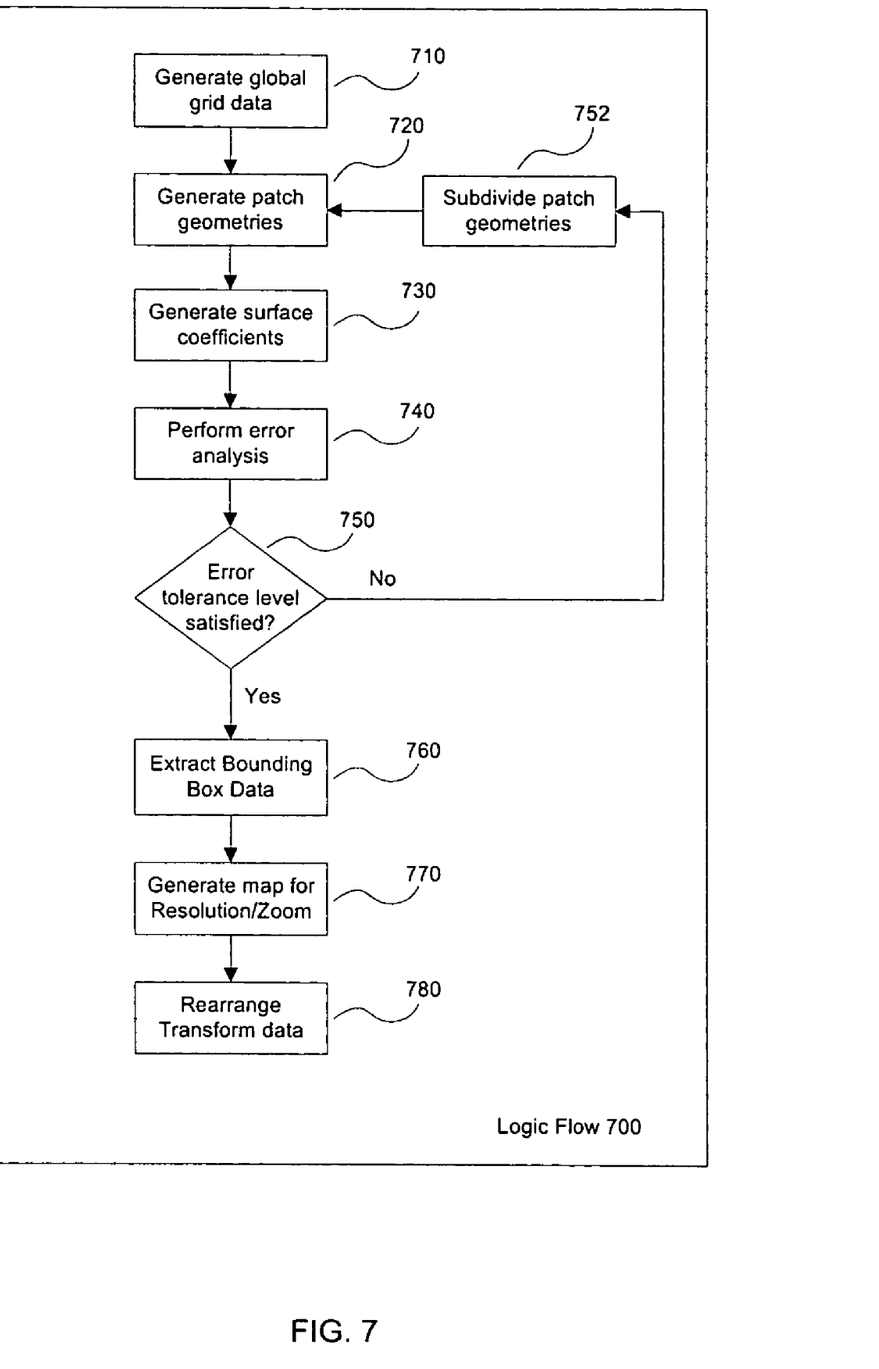
FIG. 7 is a general flowchart representation of the transformation method of the present invention.

FIG. 7 illustrates the logic flow 700 of an example of the present invention. At step 710, a grid data set is generated containing pairs of coordinates mapping each output pixel to an input pixel (inverse mapping). At step 720, patch geometries are generated depending on the underlying geometry and the complexity of the warp. At step 730, the grid data set description is approximated via surface fitting and surface coefficients are generated, At this point surface data and patch data are all generated. These data are analyzed at steps 740 and 750 in comparison with the exact coordinates of the grid data set generated at step 710. If the error of the approximation of pixels generated via patch geometry and surface fitting is greater than a predetermined tolerance level at step 752, this information is used to further subdivide the patch geometry of step 720. This loop is continued till the errors are within the tolerance level.

Once the error analysis step is satisfied, at step 760, the active area of the output image is determined and bounding boxes are extracted which contain the active area. This is to restrict the processing to this area to save some processing time.

At step 770, maps for possible resolution change and zooming are generated to perform these operations in unison with the warp transformation by scaling of the surface coefficients. At step 780, the transformation is rearranged in a way as to increase hardware implementation efficiency by reducing the number of multipliers.

Warp system 100 of the present invention provides several significant advantages over prior art image transformation methods. First, warp system 100 is an efficient hardware implementation of real-time image transformation systems by utilizing scan-line processing, small memory requirements and a simple polynomial based representation. It represents arbitrary transformations in a unified manner. Transformations are based on a surface-patch description in the output space (an inverse mapping formalism), providing a closed form solution that can be easily manipulated for additional effects. All transformations consist of parameters specifying patch geometry and surface coefficients. The pixel-by-pixel description can be viewed as a limiting case of the surface-patch description, that is one in which a surface is fitted to every four pixels.

Warp system 100 also provides a description of spatial transformation that scales naturally with complexity. The more complex a transformation, the greater the number of required patches, that is, the format is unchanged and the increase in descriptive parameters is linear. In particular, additional features need not be introduced into the representation. The representation is general enough to incorporate complex transformation of practical interest.

Warp system 100, also generates transformations for different input/output resolutions. Since the description is given in terms of closed functional form and not pixel-by-pixel form, many warping features become simple mathematical operations on the parameters. A change in resolution is easily accounted for by a scaling of the surface coefficients. In addition, warp system 100 provides an efficient mechanism for zooming and panning. Similar to a change in resolution, zooming and panning imply a linear transformation of the surface coefficients. No re-generation of the grid data is required. Once a "base" map has been computed, the parameters in this base description can be directly modified to implement standard scaling and shift transformations.

Warp system 100 yields very low numerical errors in comparison with the "ideal" description. The errors depend largely on the resolution of the patch mesh. By increasing the number of patches, the errors can be made arbitrarily small. Beyond a certain point, further reduction of error has negligible effect on the image quality for a wide range of filters. The error tolerance level is usually limited by memory restrictions. If, in addition, the basis functions can be varied, then for a particular warp the error can be made negligible (without increasing the number of patches) by choosing an appropriate fitting basis.

Warp system 100 requires low memory storage space (i.e. data file size) for describing spatial transformations making the method attractive for hardware implementation. For most transformations of practical interest, sub-pixel accurate results can be obtained with a small number of patches. In this case, the data file size consists primarily of a small number of surface coefficients as opposed to a large pixel-by-pixel positional table.

Warp system 100 applies independent transformations to different parts of an image to obtain very general mappings. Every patch (and its data) can be treated as an independent sub-map, which allows different regions of an image to be transformed independently. The transformation need not be globally defined by a single continuous surface. Different maps can be combined or "stitched" together to form a single map with the same format. Warp system 100 incorporates well-established geometric modeling techniques, such as B-spline and Bezier surface fitting, for optimal results. Depending on the need, the surface coefficients can be generated using techniques of varied numerical/mathematical sophistication. B-spline and Bezier surfaces fit naturally within the framework of the present invention. These surfaces provide explicit control of surface continuity across patches. The patch divisions can also be easily derived from the knot sequences of the spline surfaces. Using these surfaces with the least squares fitting technique, the process of generating a surface description can be automated for many commonly used simple warps.

One particular implementation of warp system 100 allows non-rectangular patches, which will give more control over the fitting, though complicating the patch geometries. In this example of the present invention, patch geometries are described by parametric boundary curves. The parameterization can be in terms of one of the coordinates, the choice of which depends on the orientation of the boundary curve. For rectangular patches, these boundary curves are simply vertical and horizontal lines. Arbitrary shaped patches, combined with the other features discussed above, provide an extreme level of flexibility to generate very complicated 2D image warping in principle.

In another implementation, warp system 100 uses rectangular patches, but it also allows for boundary curves that restrict the evaluation domains of the boundary patches, i.e., patches which border image and background regions. In this manner, all computations are only performed on patches or parts of patches that lie within the domain(s) specified by the boundary curves. This serves to confine the fitting to well-defined regions.

The method described above can be expanded to include multiple pass to support layering of image surfaces. The image data may include depth information that is re-sampled as per image luminance and chrominance data. The depth information is used in the layering process to determine visibility or occlusion of each pixel. The surfaces need not be of the same size and can be overlapping or non-overlapping.

As will be apparent to those skilled in the art, various modifications and adaptations of the structure described above are possible without departing from the present invention, the scope of which is defined in the appended claims.

The invention claimed is:

1. An electronic system for implementation of a two dimensional image transformation in a single pass, the transformation transforming an input image having input pixel coordinates, to an output image having output pixel coordinates, said system comprising:
   (a) a geometry input interface for obtaining geometric parameters that define the transformation and which include lens parameters describing display optics, projection angles, display panel geometry for flat screen and curved screen, and user specified parameters;
   (b) a grid transformation generator, coupled to said geometry input interface, for generating a grid data transformation that maps the output pixel coordinates onto the input pixel coordinates;
   (c) a patch geometry generator, coupled to said grid transformation generator, for dividing the output pixel coordinate space into a number of corresponding patches according to an underlying geometry, each patch having an associated grid data set, said patch geometry generator determining the boundaries of the output space patches;
   (d) a surface function estimator, coupled to said patch geometry generator, to parameterize the grid data set for each patch as a surface functional represented by surface coefficients; and
   (e) an output interface coupled to the surface function estimator to store the surface coefficients.

2. The system of claim 1, further including an error analysis stage, coupled to said surface function estimator, said patch geometry generator, and said grid transformation generator, said error analysis stage being adapted to perform a mesh error analysis to determine whether the difference between an evaluation of one of the set of surface functions at a selected coordinate point and a corresponding coordinate point from the grid data description, is within a preset error tolerance, and if not, to send the results of the error analysis to said patch geometry generator to further subdivide the patch mesh for finer resolution.

3. The system of claim 1, further including a bounding box generator, adapted to generate a bounding box around the active area of the image to reduce processing associated with inactive regions.

4. The system of claim 1, wherein the system is adapted to determine whether the surface coordinates lie within the input space, and if not, to prevent further processing of the data of the output pixel.

5. The system of claim 1, wherein, said surface function estimator is adapted to represent the surface functional via polynomials.

6. The system of claim 5, wherein, said polynomials are third degree polynomials.

7. The system of claim 6, wherein said surface function estimator is adapted to fit said polynomials via least-square method using tensor product bi-cubic splines.

8. The system of claim 6, wherein said surface function estimator is adapted to calculate polynomials by factoring out the coefficients of different power to reduce multiplication operations.

9. The system of claim 5, wherein surface fitting is done by treating the surface as a polynomial in x, with the coefficients of the x-polynomial being polynomials in y.

10. The system of claim 1, wherein the patch division is optimized via gradient search.

11. The system of claim 1, wherein the patch division is optimized via random search.

12. The system of claim 1, wherein the patch division is optimized via a combination of random and gradient search, and wherein the random search first finds an optimum geometry and then the gradient search fine-tunes the optimum geometry.

13. The system of claim 1, further including a resolution change stage to change the determined surface coefficients to accommodate the resolution change without repeating the warping operation.

14. The system of claim 1, further including a zooming stage to change the determined surface coefficients to accommodate the zooming without repeating the warping operation.

15. The system of claim 1, adapted to fitting individual rectangular sub-patches separately.

16. The system of claim 1, wherein said surface function estimator is adapted to redefine the coordinate origin for each patch to be located on the patch, to reduce the range of numbers used for fitting coordinates.

17. The system of claim 1, adapted to correct optical nonlinearities including pincushion and barrel lens distortions.

18. The system of claim 1, adapted to correct projection distortions including keystone distortion.

19. The system of claim 1, adapted to projection onto a curved surface.

20. The system of claim 1, adapted in panoramic vision systems using wide-angle lenses.

21. The system of claim 1, adapted to correct combined distortions explained in claim 17, 18, 19, and 20.

22. The system of claim 1, further adapted to include layering of image surfaces to include depth information that is re-sampled as per image luminance and chrominance data, and wherein depth information is used in the layering process to determine visibility or occlusion of each pixel.

23. A method for representing a two dimensional image transformation to perform in a single pass, said transformation transforming an input image having input pixel coordinates to an output image having output pixel coordinates, said method comprising:
  (a) obtaining geometric input parameters that define the transformation and that include lens parameters describing display optics, projection angles, display panel geometry for flat screen and curved screen, and user specific parameters;
  (b) generating a grid data transformation based on said geometric input parameters, to map the output pixel coordinates onto the input pixel coordinates;
  (c) dividing the output pixel coordinate space into a number of corresponding patches according to an underlying geometry, each patch having an associated grid dataset and determining the boundaries of the output space patches;
  (d) parameterizing said grid data transformation, in each of the patches, as a surface functional represented by surface coefficients; and
  (e) storing said surface coefficients.

24. The method of claim 23, further performing a mesh error analysis to determine whether the difference between an evaluation of one of the set of surface functions at a selected coordinate point and a corresponding coordinate point from the grid data description, is within a preset error tolerance, and if not, to further subdivide the patch mesh for finer resolution.

25. The method of claim 23, further generating a bounding box around the active area of the image to reduce processing associated with inactive regions.

26. The method of claim 23, further determining whether the surface coordinates lie within the input space, and if not, to prevent further processing of the data of the output pixel.

27. The method of claim 23, wherein said surface functionals are represented via polynomials.

28. The method of claim 27, wherein said polynomials are third degree polynomials.

29. The method of claim 28, wherein said polynomials are fitted via least-square method using tensor product bi-cubic splines.

30. The method of claim 28, wherein said polynomials are computed by factoring out the coefficients of different power to reduce multiplication operations.

31. The method of claim 27, wherein surface fitting is done by treating the surface as a polynomial in x, with the coefficients of the x-polynomial being polynomials in y, to further speed up the processing.

32. The method of claim 23, wherein the patch division is optimized via gradient search.

33. The method of claim 23, wherein the patch division is optimized via random search.

34. The method of claim 23, wherein the patch division is optimized via a combination of random and gradient search, and wherein the random search first finds a optimum geometry and then the gradient search fine-tunes the optimum geometry.

35. The method of claim 23, further changing the determined surface coefficients to accommodate the resolution change without repeating the warping operation.

36. The method of claim 23, further changing the determined surface coefficients to accommodate the zooming without repeating the warping operation.

37. The method of claim 23, wherein individual rectangular sub-patches are fitted separately.

38. The method of claim 23, further redefining the coordinate origin for each patch to be located on the patch, to reduce the range of numbers used for fitting coordinates for efficient hardware implementation.

39. The method of claim 23, applied to correct optical nonlinearities including pincushion and barrel lens distortions.

40. The method of claim 23, applied to correct projection distortions including keystone distortion.

41. The method of claim 23, applied to projection onto a curved surface.

42. The method of claim 23, applied in panoramic vision systems using wide-angle lenses.

43. The method of claim 23, applied to correct combined distortions explained in claim 39, 40, 41, and 42.

44. The method of claim 23, further layering of image surfaces to include depth information that is re-sampled as per image luminance and chrominance data, and wherein depth information is used in the layering process to determine visibility or occlusion of each pixel.

* * * * *